(12) United States Patent
Iwashiro

(10) Patent No.: US 6,429,996 B1
(45) Date of Patent: Aug. 6, 2002

(54) METHOD AND APPARATUS FOR HEAD-POSITIONING CONTROL, FOR USE IN A DISK DRIVE

(75) Inventor: Masafumi Iwashiro, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/244,095

(22) Filed: Feb. 4, 1999

(30) Foreign Application Priority Data

Apr. 30, 1998 (JP) .......................................... 10-120744

(51) Int. Cl.⁷ .............................................. G11B 5/596
(52) U.S. Cl. ................................. 360/78.07; 360/78.04
(58) Field of Search ........................... 360/77.02, 78.01, 360/78.04, 78.06, 78.07, 75, 77.04, 77.05, 78.09

(56) References Cited

U.S. PATENT DOCUMENTS

| | | | | |
|---|---|---|---|---|
| 4,697,127 A | | 9/1987 | Stich et al. ................. | 318/561 |
| 4,775,903 A | * | 10/1988 | Knowles ................... | 360/78.07 |
| 5,404,255 A | | 4/1995 | Kobayashi et al. ...... | 360/78.09 |
| 5,859,742 A | * | 1/1999 | Takaishi .................. | 360/78.01 |
| 5,936,792 A | * | 8/1999 | Kobayashi et al. ...... | 360/78.07 |
| 5,940,239 A | * | 8/1999 | Lee et al. ................. | 360/77.02 |
| 6,011,668 A | * | 1/2000 | Choi ........................ | 360/78.06 |
| 6,031,684 A | * | 2/2000 | Gregg ..................... | 360/78.06 |

* cited by examiner

*Primary Examiner*—David Hudspeth
*Assistant Examiner*—Mitchell Slavitt
(74) *Attorney, Agent, or Firm*—Pillsbury Winthrop LLP

(57) ABSTRACT

Disclosed herein is a head-positioning control system designed to move a head to a target position over a disk used as a recording medium. The system causes an actuator to perform a seek operation, thus moving the disk from a prescribed start position to the target position. The system generates seek profile data representing a motion which the head makes during the seek operation. On the basis of the seek profile data, the gain of the system is estimated. A gain-adjusting value is calculated from the gain thus estimated. The gain-adjusting value is applied, adjusting the gain of the system to an appropriate gain.

9 Claims, 3 Drawing Sheets

METHOD AND APPARATUS FOR HEAD-POSITIONING CONTROL, FOR USE IN A DISK DRIVE

BACKGROUND OF THE INVENTION

The present invention relates to a digital position control system, and more particularly to a system for head-positioning control, for use in a disk drive such as a hard disk drive.

Controls in a disk drive such as a hard disk drive (HDD) have become complicated. Further it is demanded that the controls be effected with high efficiency. Most of the disk drives recently developed can perform head-positioning control (servo control) by using a digital position control system that has a microprocessor (CPU).

The digital position control system monitors the condition of an object of control at prescribed intervals and executes control rules described in a program, thereby supplying a control signal to the object. Capable of executing high-level control rules, the digital position control system can help design a head-positioning control system of high precision.

A digital position control system is known which performs dead beat control (also called "finite time settling control"). Dead beat control is to move an object (e.g., a head) from its start position to a target position within a predetermined time. More specifically, the control signal is changed a prescribed number of times, at the intervals of monitoring the position of the object, and thereafter the settling control is performed until the object reaches a target state from the initial state within the prescribed time. The "prescribed number of times" has been calculated from the initial state and target state of the object and corresponds to the order of the object.

The dead beat control is, however, disadvantageous in that the control signal greatly changes within a short time as it is repeatedly changed many times. Consequently, the object is likely to vibrate in a higher-order mode. That is, the dead beat control is much influenced by disturbance and higher-order mode. It is therefore an impractical method of controlling the positioning of the head of an HDD.

A digital position control system has been proposed which is a combination of dead beat control and model following control. As shown in FIG. 6, this control system comprises a model following control section 23 and a dead beat control section 24. The dead beat control section 24 generates a reference control value. A model 26 is a mathematical formula, or the equation of motion, which represents the dynamic characteristics of a plant 25 (i.e., object). It is assumed that the model 26 can be all state quantities of the plant 25. In practice, the plant 25 is a unit composed of an actuator and voice coil motor, which move the head of an HDD. The target position 21 and the start position 22, both shown in FIG. 6, are positions the head may take over the disk (data storage medium) incorporated in the HDD. The digital position control system shown in FIG. 6 is actually a system for controlling the positioning of the head in the HDD. It moves the head from the start position 21 to the target position 2.

The model following control section 23 calculates a control value from the response the model 26 has made to the reference control value. The response from the model 26 is output data representing the reference position of the model 26 and is, therefore, used as reference profile. The control value, thus calculated, is supplied to the plant 25, causing the plant 25 to operate in accordance with the reference profile. That is, the section 23 calculates a control value adjusted by the reference value generated by the dead beat control section 24, and the control value makes the output of the plant 25 (i.e., the position of the head) coincide with the output of the model 26 (i.e., the reference position for the head).

The system shown in FIG. 6, i.e., a combination of dead beat control and model following control, can control the positioning of the head at high speed and with high reliability. In the HDD, however, the actual gain (i.e., output-to-input ratio) may greatly differ from the design value due to the component differences and the changes in environmental conditions. More specifically, when the ambient temperature of the head changes greatly, the magnet in the voice coil motor (i.e., the drive motor for the actuator) may change in its characteristic.

When the gain of the system, more particularly the gain of the dead beat control section 24, changes, the seek profile for moving the head to the target position becomes unstable. The gain of the system usually decreases as the ambient temperature of the head rises. As the system gain decreases, the seek profile may become unstable. If this happens, it will take much time to settle the head, though the head can reach the target position within a relatively short time. The target position is actually one of the tracks formed on the disk, and the system must settle the head over this track. If the settle region in the seek profile changes greatly, the seek time (i.e., the time the head needs to reach the target position) will inevitably increase.

BRIEF SUMMARY OF THE INVENTION

The object of the present invention is to provide a head-positioning control system in which a gain optimal to compensate for the characteristic changes of a plant can be set to perform head-positioning control with high reliability and at high speed.

The head-positioning control system according to the invention estimate the gain on the basis of the seek profile when the head is moved to the target position, calculates an optimal gain from the gain estimated, and sets the optimal gain thus calculated.

The system according to the invention is designed for used in a disk drive incorporating a head for reading and writing data on and from a disk and actuator means for moving the head from a start position to a target position on the disk. The system comprises: control means for controlling the actuator means in accordance with a gain and a difference between the position of the head and the target position, causing the actuator means to move the head from the start position to the target position; data-generating means for generating seek profile data representing a motion of the head from the start position to the target position; gain-estimating means for estimating the gain from the seek profile data generated by the data-generating means; and gain-setting means for determining a gain-adjusting value from the gain estimated by the gate-estimating means and setting the gain adjusted by the gain-adjusting value as a gain appropriate for the system.

In the head-positioning control system, an optimal gain can be set even if the gain initially set happens to change. The system can therefore accomplish head-positioning control with high reliability and at high speed. It performs the head-positioning control reliably and fast, particularly when it is a combination of a model following control section and a dead beat control section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Digital Position Control System

Figure 1:
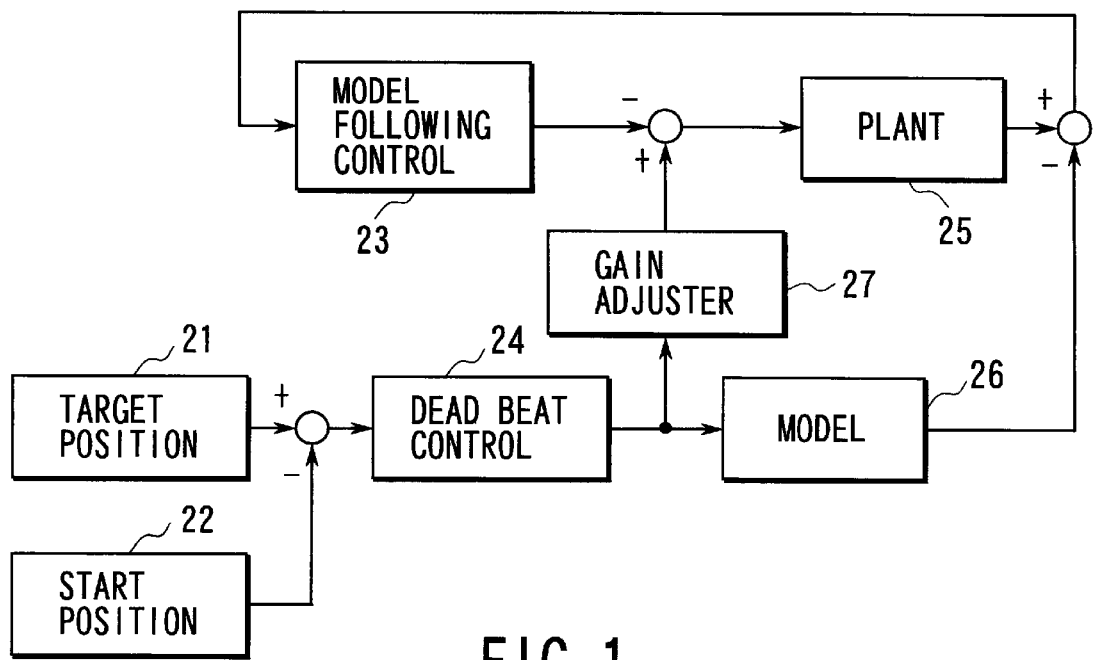
FIG. 1 is a block diagram showing a head-positioning control system according to the present invention.

The system according to the invention is a digital position control system, which is shown in FIG. 1. As FIG. 1 shows, the system is a combination of a model following control section 23 and a dead beat control section 24. The system has a gain adjuster 27 designed to adjust the gain of the system in order to compensate for the characteristic changes of a plant 25. The gain adjuster 27 adjusts the gain of the reference control value input to a model 26 from the dead beat control section 24. (How the adjuster 27 adjusts the gain will be explained with reference to FIG. 3.)

The model 26 is a mathematical formula, or the equation of motion that represents the dynamic characteristics of the plant 25. It is assumed that the model 26 can be all state quantities of the plant 25. The plant 25 is a unit composed of an actuator and voice coil motor, which move the head of an HDD as will be described later. The target position 21 and the start position 22, both shown in FIG. 1, are positions the head may take over the disk (data storage medium) incorporated in a HDD. The digital position control system is designed to control the positioning of the head in the HDD. It moves the head from the start position 21 to the target position 2. The dynamic characteristics of the plant 25 are equivalent to the seek characteristics of the head.

The model following control section 23 calculates a control value from the response the model 26 has made to the reference control value. The response from the model 26 is output data representing the reference position of the model 26 and is, therefore, used as reference profile. The control value, thus calculated, is supplied to the plant 25, causing the plant 25 to operate in accordance with the reference profile. That is, the section 23 calculates a control value adjusted by the reference control value generated by the dead beat control section 24, and the control value makes the output of the plant 25 (i.e., the position of the head) coincide with the output of the model 26 (i.e., the reference position for the head). In other words, the control value eliminates the difference between the output of the plant 25 and the output of the model 26.

The dead beat control section 24 calculates the above-mentioned reference control value from the target position 21and the start position 22. The reference control value is. equivalent to the state quality of the plant 25, i.e., the seek distance the head will be moved until it reaches the target position 21.

Disk Drive

Figure 2:
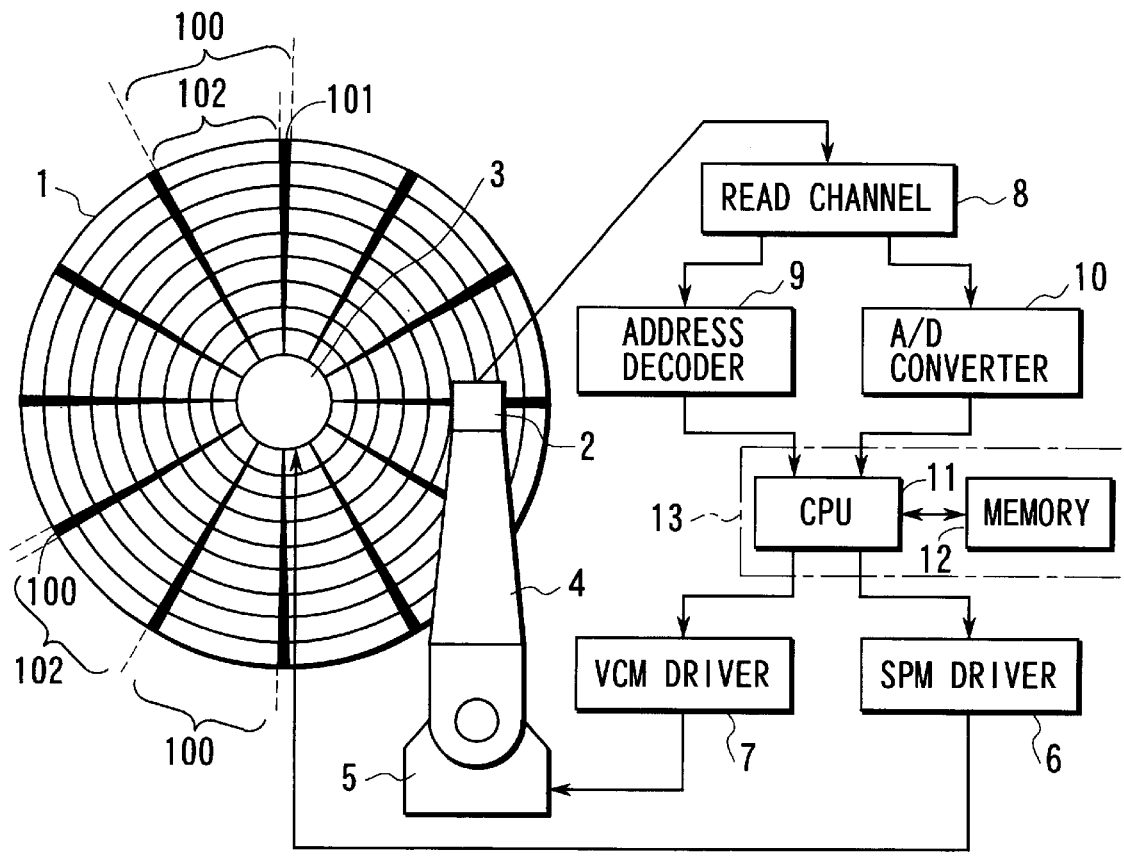
FIG. 2 is a block diagram depicting the hard disk drive incorporating the head-positioning control system of the invention.

The digital position control system shown in FIG. 1 is designed to control the positioning of the head of a hard disk drive (HDD) of the type shown in FIG. 2. As shown in FIG. 2, the HDD comprises at least one magnetic disk 1, at least two magnetic heads 2, a spindle motor (SPM) 3, an actuator 4, a voice coil motor (VCM) 5, a SPM driver 6, a VCM driver 7, and control circuits 8 to 12.

The magnetic heads 2 are mounted on the actuator 4 and oppose the data-recording surfaces of the magnetic disk 1, respectively. The VCM driver 7 supplies a drive current to the VCM 5 under the control of the CPU 11, which will be described later. The VCM 5 drives the actuator 4, which in turn moves the heads 2 in the radial direction of the magnetic disk 1.

The at least one magnetic disk 1 is connected to the SPM 3. The SPM 3 rotates the disk 1 at high speed. A number of concentric tracks are formed on either data-recording surface of the disk 1. Each of the tracks has a plurality of servo regions 101, which are spaced, at regular intervals in the circumferential direction of the disk 1. Provided between any two adjacent servo regions 101 of each track is a data region (user data region) 102. The data region 102 of each track is divided into data sectors. Each servo region 101 and the data region 102 that follows the region 101 constitute a servo sector 100. Hence, a number of servo sector 100 are provided on either data-recording surface of the disk 1. Each servo sector 100 is identified by a serial number called "servo sector number."

Servo data is recorded in the servo region of each servo sector 100. The servo data includes a servo sector number, a track address (cylinder code), and servo burst data. The track address is an ID code identifying the track and used to determine the position of the heads 2. The servo burst data is an analog amplitude-signal pattern, which is used to detect a position error of each head 2 located over any track. (The position error is a deviation of the head 2 from the centerline of the track or the boundary of he track with the next one.)

The SPM driver 6 is integrated with the VCM driver 7. The SPM driver 6 receives a VCM control value (digital data) the CPU 11 has generated to control the positioning of the heads 2. In accordance with the control values the SPM driver 6 supplies a drive current to the SPM 3.

The heads 2 are connected to a head amplifier (not shown), which is connected to the read channel 8. The read channel 8 receives the signal (i.e., servo data or user data) that each head 2 has read from the magnetic disk 1. The read channel 8 processes the signal, thereby reproducing the servo data or user data.

The control circuits provided other than the read channel 8 are an address decoder 9, an A/D converter 10, the CPU 11 and a memory 12. The address decoder 9 and A/D converter 10 constitute a position detecting circuit 14. The address decoder 9 decodes the servo data and generates a servo sector number and a track address, which are supplied to the CPU 11. The A/D converter 10 converts the servo data (i.e., a position-error analog signal) to, for example, an 8-bit digital value, which is supplied to the CPU 11. The CPU 11 calculates a position error, detecting the positions the heads 2 take over the track identified with the track address that has been generated by the address decoder 9. More correctly, each position thus detected is the position of one of sub-tracks forming one track. It should be noted that each track consists of, for example, concentric 512 sub-tracks arranged at regular intervals in the radial direction of the disk 1.

The CPU (microprocessor) 12 and the memory 12 constitute a controller 13 which performs head-positioning control or some other controls. The memory 12 comprises a ROM (Read-Only Memory) and a RAM (Random-Access Memory). The ROM stores the control programs for the CPU 11. The RAM is provided for storing various data items such as gain values that the CPU 11 uses to accomplish the head-positioning control. The controller 13 is an major component of the digital position control system of FIG. 1. The controller 13 calculates the position of a track from the track address input from the address decoder 9. The controller 13 also obtains a position the track may have. On the basis of the position of the track calculated, the controller 13 performs head-positioning control to position the heads 2 at the target position (i.e., the target track recording the data sector that is to be accessed).

In FIG. 2, some components of the HDD are not illustrated. Among these components is a disk controller (HDC) that is an interface with a host computer. The disk controller is designed to transfer data between the HDD and the host computer.

The SPM 3 rotates the disk 1 at a predetermined angular speed. The position each head takes at present is detected from the first servo region 101 of each servo sector 100 in synchronism with the angle through which the disk rotates. The controller 13 is therefore a head-positioning control system that determines the control value to be input to the plant 25. As indicated above, the plant 25 is composed of the actuator 4 and the VCM 5 and designed to position the heads 2 (or to perform seek operation). In practice, the controller 13 inputs the control value to the VCM driver 7, thus controlling the VCM driver 7. Thus controlled, the VCM driver 7 drives the VCM 5. Driven by the driver 7, the VCM 5 moves the actuator 4. The maximum control value, which can be input to the VCM driver 7, is predetermined from the mechanical and electrical restrictions imposed on the controller 13.

The head-positioning control carried out in the HDD consists of two controls. The first control is seek control for moving each head 2 to the target track (i.e., the track to be accessed). The second control is track-following control for moving each head 2 along the centerline of the target track. The track-following control is "head-positioning control" in a narrow sense of the term.

Gain-Adjusting Process

How the controller 12 (i.e., head-positioning control system) adjusts the gain in the HDD of FIG. 2 will be explained with reference to FIGS. 3 to 5.

Figure 3:
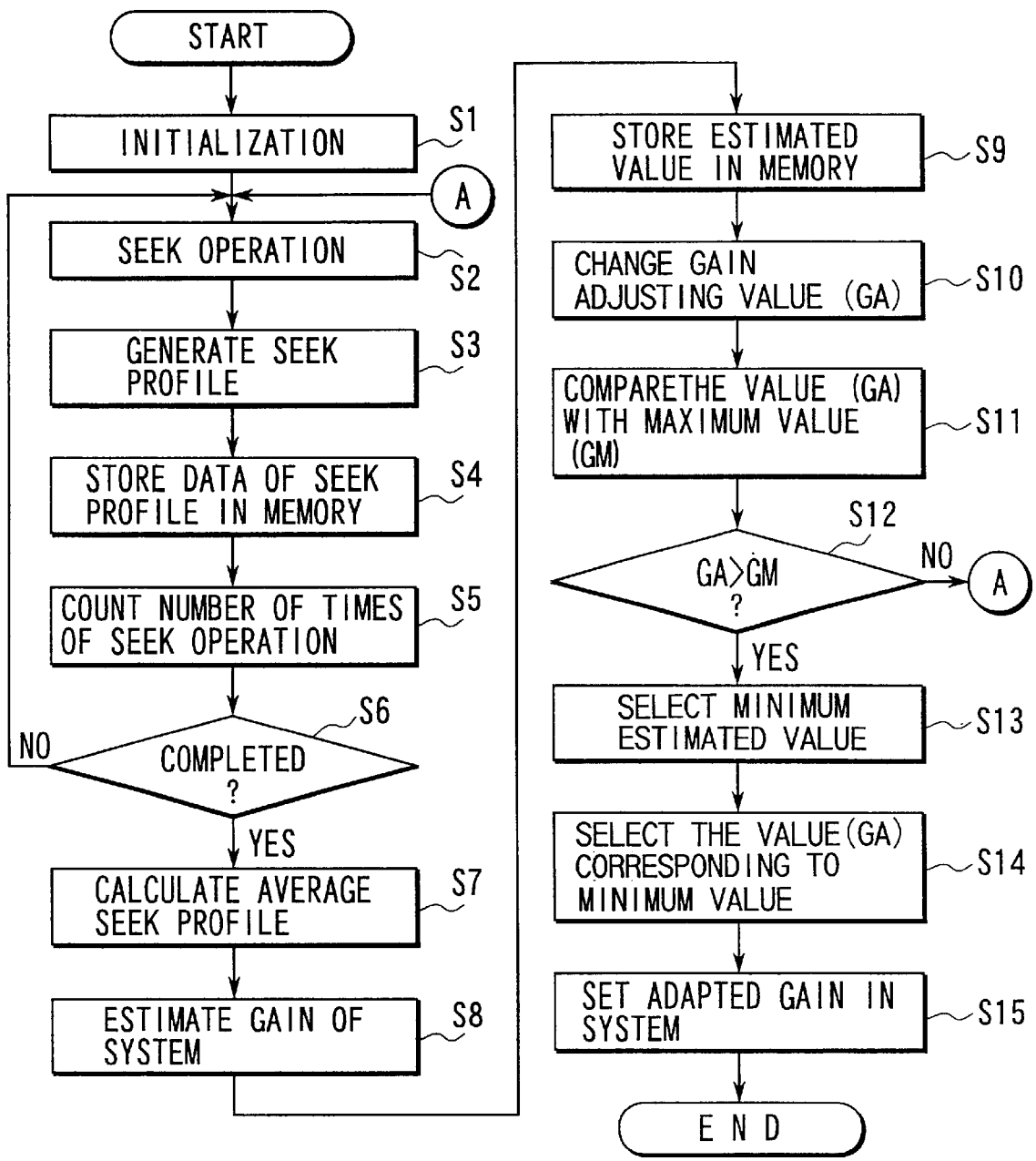
FIG. 3 is a flow chart explaining the process of adjusting the gain in the system shown in FIG. 1.

As shown in the flow chart of FIG. 3, the controller 13 sets an initial gain, a gain-adjusting data region on the disk 1, a value by which to adjust the gain each time, and a number of times seek operation should be repeated for each track (Step S1). (The initial gain is the reverence value that the dead beat control section 24 has calculated from the target position 21 and the start position 22.)

The controller 13 then performs seek operation for one track (Step S2). Namely, the controller 13 cause each head 2 to move for a one-track distance, from the start position 21 (i.e., the start position of seek operation) to the target position 22. Both positions 21 and 22 have been set on the disk 1. More specifically, the controller 13 calculates a control value from the position error of the head 2 (i.e., the difference between the start position 21 and the target position 22). The control value is input to the VCM driver 7, controlling the VCM driver 7. In other words, the model following control section 23 and dead beat control section 24 calculate the control value in the digital position control system shown in FIG. 1. The control value calculated is input to the plant 25. At the initial stage of the gain-adjusting operation, the gain adjuster 27 adjusts the gain to the initial value, or zero.

The controller 13 generates a seek profile when the head 2 is moved from the start position 21 to the target position 22, and stores the data representing the seek profile into the memory 12 (Steps S3 and S4).

Figure 4:
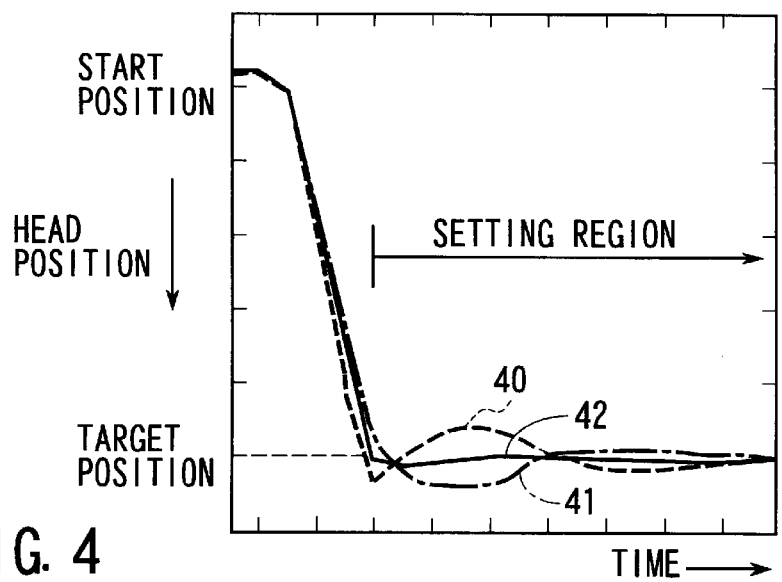
FIG. 4 is a graph representing the seek profile related to the gain-adjusting process.
Figure 5:
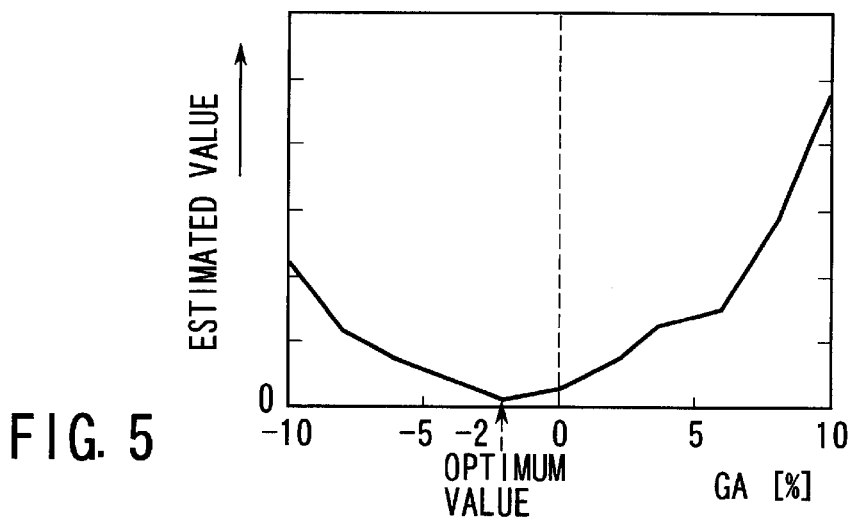
FIG. 5 is a graph showing how the gain is estimated in order to adjust the gain.
Figure 6:
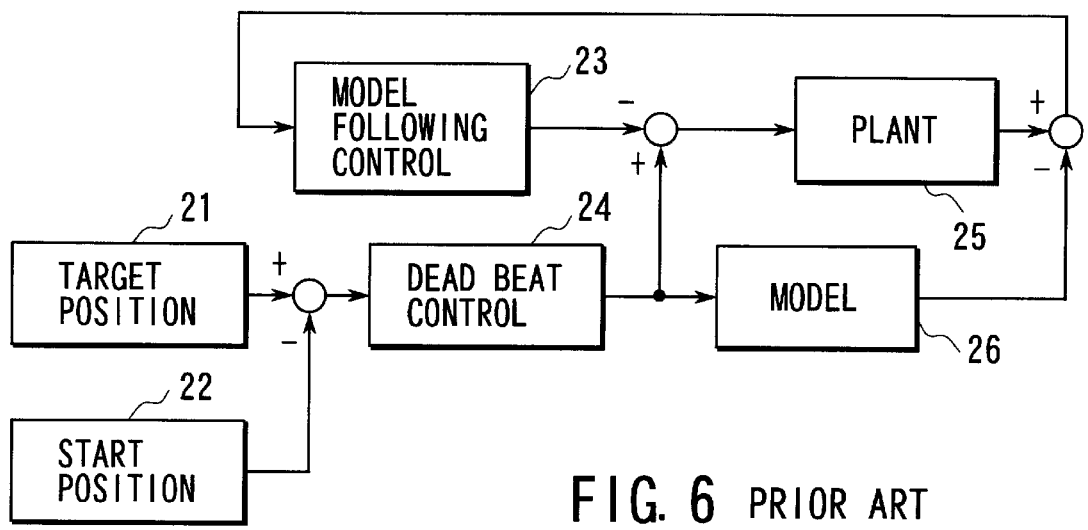
FIG. 6 is a block diagram of a conventional digital position control system.

FIG. 4 is a graph representing the various seek profiles the controller 13 generates on the basis of different parameters. As seen from FIG. 4, the seek profiles are digital data items, each indicating how the head 2 moves to the target position 22 as the time goes. In the graph of FIG. 4, the time is plotted on the abscissa and the distance the head moves is plotted on the ordinate. The parameters are a relatively large gain 40, a relatively small gain 41, and an appropriate gain 42. The appropriate gain 42 is one, which is set by the gain-adjusting operation of this invention. That part of each seek profile which corresponds to the target position is called "settled region." It is in the settled region that the head 2 is settled at the target position after the head 2 has reached a position near the target position. In the head-positioning control system it is desired that the settle region extends for a short time. In other words, the object of this invention is to set, in the settle region, a optimal gain (i.e., the appropriate gate 42) for the system within a short time.

The controller 13 repeats the seek operation the number of times which has been set, calculates an average seek profile from the gain initially set, and stores the average seek profile in the memory 12 (Steps S5 to S7). The controller 13 then estimates the gain of the system on the basis of the average seek profile (i.e., the initial gain) (Step S9). The estimated gain is stored into the memory 12 (Step S9). The estimated gain is, by definition, the sum of the squares of differences between the target position and various positions the head 2 takes in the settle region of the seek profile. It corresponds to the residual position fluctuation the head 2 undergoes in the settle region. The minimum estimated gain is the most appropriate one. (The residual position fluctuation is the position error the head 2 has before it is settled at the target position.)

The controller 13 sets or change an gain-adjusting value GA by which the gain (including the one initially set) is changed (Step S10). The gain-adjusting value GA is compared the prescribed maximum gain-adjusting value (Step S11). Namely, it is determined whether the value GA is greater than the maximum gain-gain GM (Step S12). If NO in Step S12, the sequence of Steps S2 to S9 is repeated until the adjusted gain-adjusting value GA becomes equal to the maximum gain GM.

The controller 13 stores various estimated gains corresponding to the gain-adjusting values GA, into the memory 12. As shown in FIG. 5, each gain-adjusting value AD is represented in percentage based on the corresponding estimated gain. The controller 13 selects the minimum of the estimated gains stored in the memory 12 (Step S13). Further, the controller 13 selects the gain-adjusting value GA corresponding to the estimate gain selected (Step S14.) More correctly, the controller 13 selects the gain-adjusting value of −2% which corresponds to the minimum estimated gain and which is therefore the optimum gain-adjusting value, as can be seen from FIG. 5. The controller 13 adjusts the gain of the system by using the optimum gain-adjusting value (−2%), thereby generating an adapted gain (i.e., appropriate gain 42) which minimizes the position error (residual position fluctuation) that the head 2 may have in the settle region of the seek profile. The adapted gain is set as the gain of the system (Step S15). Namely, the gain adjuster 27 uses the optimum gain-adjusting value to adjust the gain of the reference control value that has been input to the model 26 from the dead beat control section 24 in the digital position control system of FIG. 1.

In the final step of manufacturing the HDD, the gain-adjusting method described above may be effected. If so, the digital position control system of FIG. 1 can have a gain that is appropriate for the mechanical and electrical characteristics of the HDD. Even if the gain initially set in the system changes due to some factors, it is adjusted to one appropriate for the HDD by an optimal gain-adjusting value corresponding to the minimum estimated gain. The gain-adjusting method effectively prevents changes in gain that may impair the reliability and high-speed of the HDD, particularly when it is used in a head-positioning control system, which is a combination of a model following control, section and a dead beat control section.

The gain-adjusting method of the invention may be performed not only while the HDD is being manufactured, but also when the HDD is activated for the first time after shipment or when any malfunction occurs in the HDD. In practice, the time for adjusting the gain and the limited storage capacity of the memory are limited. In view of this, it is desirable to lower the precision of adjusting the gain, to reduce the number of times the seek profile is detected, and to simplify the function for estimating the seek profile. For example, the seek-profile estimating function may be simplified by using the sum of the squares of the head position errors in the settle region of the seek profile. If the function is simplified, the scale of calculation required to adjust the gain can be reduced, and the storage capacity the memory needs can be decreased.

One example of the malfunctions that may occur in the HDD is idle rotation of the disk 1 that is inevitable if the seek-settling time becomes longer than the skew time during the sequential access. Another example is a write default resulting from the insufficient settling of the seek operation.

Probably the gain always changes to some extent because the ambient temperature of the head rises as the HDD keeps on operating continuously. Therefore, the seek profile for one track is estimated during the stand-by period by applying the gain adjusted previously. It is desired that the gain be adjusted again only if the seek profile thus estimated exceeds a predetermined threshold value.

The appropriate gain and the estimated gain may be stored in a nonvolatile memory. They can be referred to as reference when the gain of the system is adjusted. In this case, the gain adjusted is further adjusted if the first adjusted gain greatly differs from the gain adjusted before.

As has been described above, the present invention can provide a head-positioning control system in which an optimal gain can be set even if the gain initially set happens to change. The system can therefore accomplish head-positioning control with high reliability and at high speed. The control system can perform the head-positioning control reliably and fast, particularly when it is a combination of a model following control section and a dead beat control section.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head-positioning control system for use in a disk drive incorporating a head for reading data from a disk and an actuator for moving the head from a start position to a target position on the disk, said system comprising:

control means for controlling the actuator in accordance with a gain and a difference between the position of the head and the target position, causing the actuator to perform a seek operation, moving the head from the start position to the target position;

generating means for generating seek profile data in a settle region during the seek operation in accordance with a plurality of gain values;

evaluating means for evaluating the seek profile data in accordance with each of the gain values; and determining means for determining a gain value appropriate for the system from the gain values in accordance with the seek profile data evaluated by said evaluating means and setting the gain value appropriate for the system as the gain of said control means.

2. The system according to claim 1, wherein said evaluating means evaluates the seek profile data including a minimum position error with respect to the target position in the settle region, as the seek profile data corresponding to an optimum gain value.

3. The system according to claim 1, wherein said generating means includes means for changing the gain values when said control means performs the seek operation.

4. The system according to claim 1, wherein said control means causes the actuator to perform the seek operation a predetermined number of times, thereby obtaining a plurality of seek profile data items, and said generating means calculates average seek profile data from the seek profile data items.

5. A method of gain control in a head-positioning control system for use in a disk drive incorporating a head for reading data from a disk and actuator means for moving the head from a start position to a target position on the disk, said method comprising:

performing a seek operation, moving the head from the start position to the target position;

generating seek profile data in a settle region during the seek operation in accordance with a plurality of gain values;

evaluating the seek profile data in accordance with each of the gain values; and determining a gain value appropriate for the system from the gain values in accordance with the seek profile data evaluated by said evaluating.

6. A method of gain control in a head-positioning control system for use in a disk drive incorporating a head for reading and writing data on and from a disk and actuator means for moving the head from a start position to a target position on the disk, said method comprising the steps of:

performing a seek operation, moving the head from the start position to the target position;

seek profile data representing a motion which the head makes during the seek operation;

using the seek profile data to estimate, as an optimum gain for the system, the gain corresponding to a minimum position error, on the basis of a position error that the head has with respect to the target position;

determining a gain-adjusting value from the gain estimated; and setting the gain adjusted by said gain-adjusting value, as a gain appropriate for the system.

7. A disk drive comprising:

a disk;

a head which reads data from the disk;

an actuator which moves the head from a start position to a target position on the disk for a seek operation; and a controller having a first controller for controlling the actuator in accordance with a gain and a difference between the position of the head and the target position and a second controller for adjusting the gain;

wherein the second controller is configured to:

generate seek profile data in a settle region during the seek operation in accordance with a plurality of gain values;

evaluate the seek profile data in accordance with each of the gain values;

determine a gain value appropriate for the system from the gain values in accordance with the seek profile data evaluated by said evaluating means; and set the gain value appropriate for the system as the gain of the first controller.

8. The disk drive according to claim 7, wherein the second controller evaluates the seek profile data including a minimum position error with respect to the target position in the settle region, as the seek profile data corresponding to an optimum gain value.

9. The disk drive according to claim 7, wherein the second controller changes the gain values when the first controller performs the seek operation.

* * * * *